UNITED STATES PATENT OFFICE.

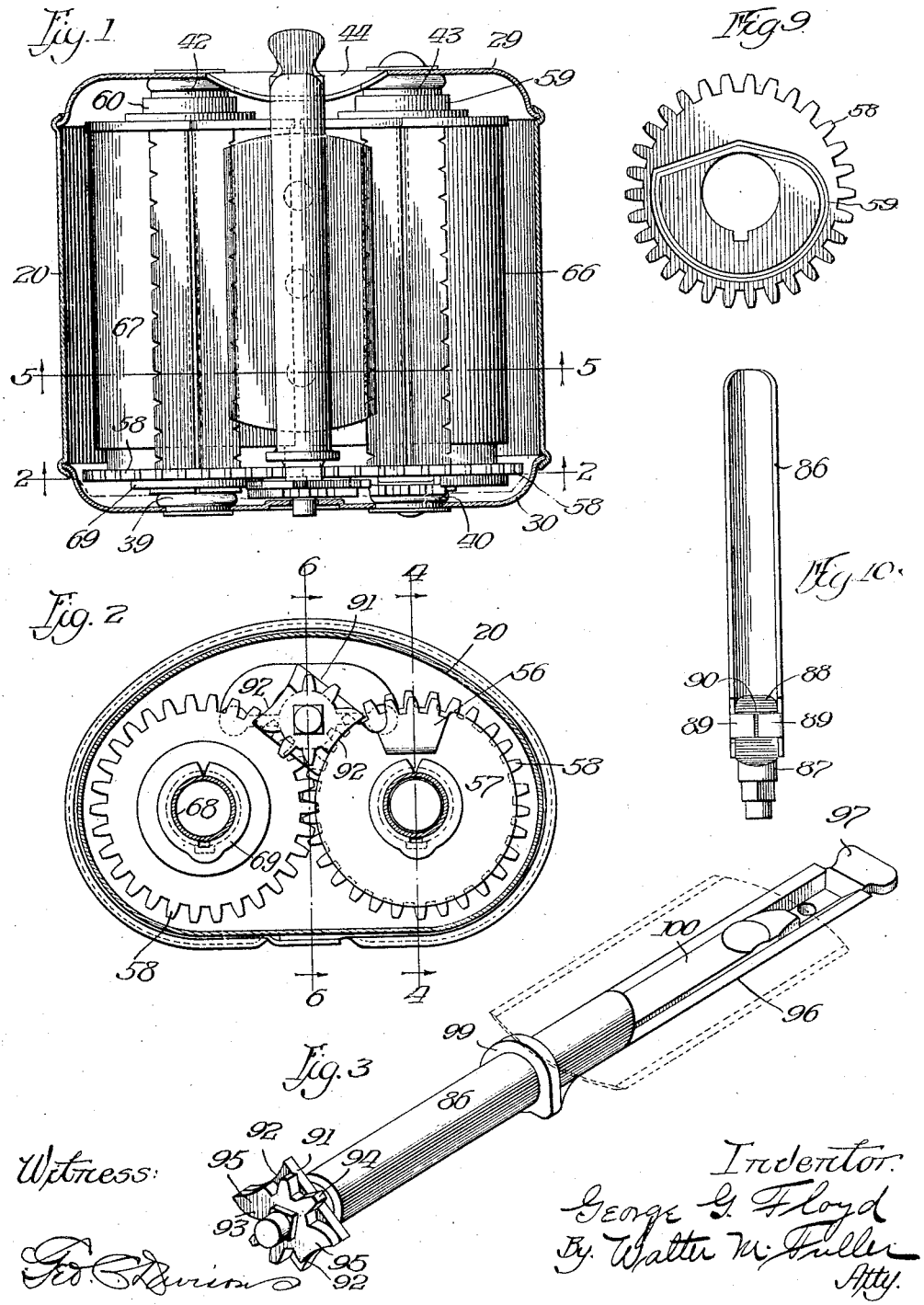

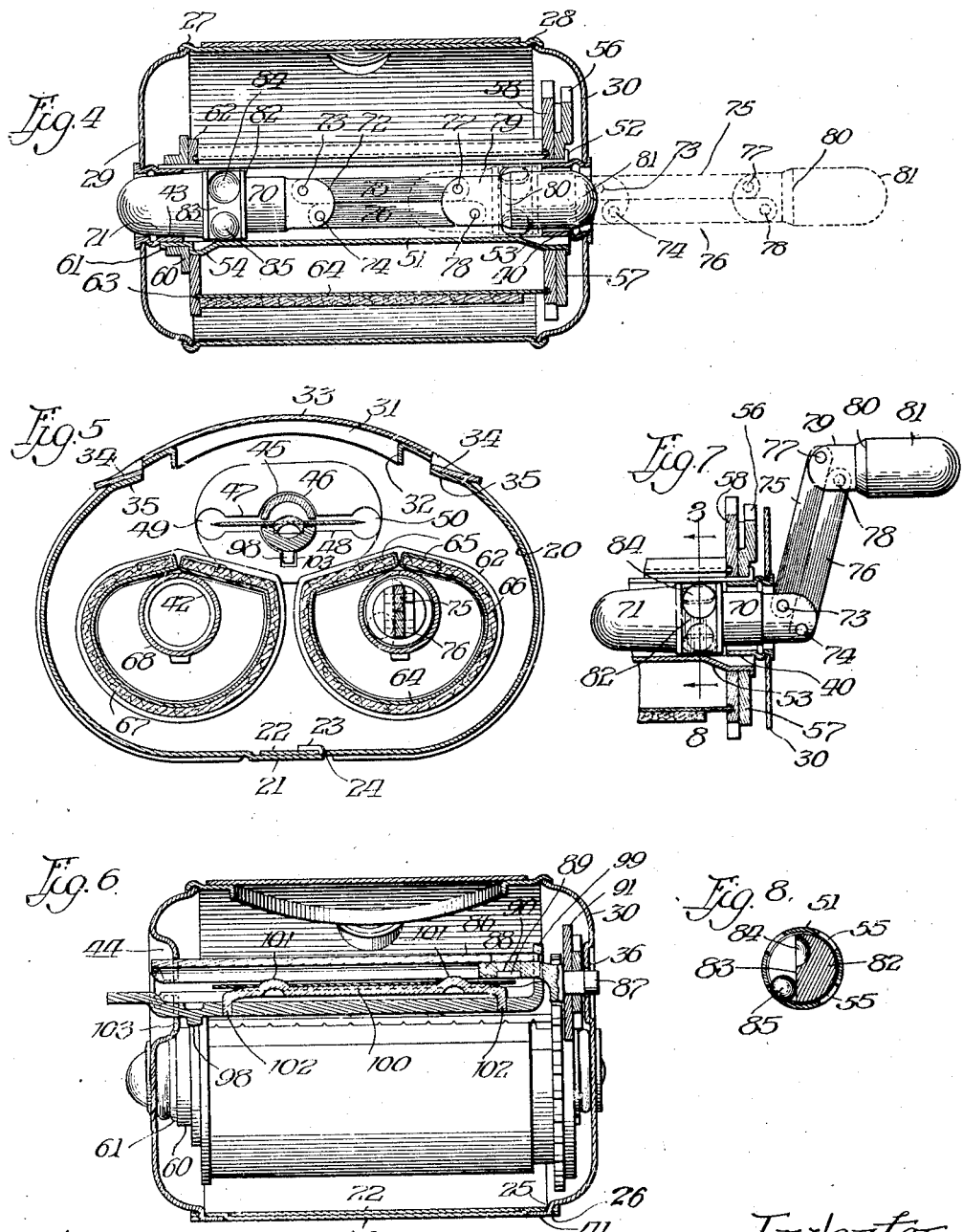

GEORGE G. FLOYD, OF RIVERSIDE, ILLINOIS.

RAZOR-BLADE SHARPENER.

1,334,295.  Specification of Letters Patent.  Patented Mar. 23, 1920.

Application filed August 18, 1917. Serial No. 186,838.

*To all whom it may concern:*

Be it known that I, GEORGE G. FLOYD, a citizen of the United States, residing at Riverside, in the county of Cook and State of Illinois, have invented certain new and useful Improvements in Razor-Blade Sharpeners, of which the following is a specification.

My invention concerns improvements in sharpeners or stroppers, such, for example, as are used for razor-blades, the present invention constituting various improvements in the appliance of my earlier United States Letters Patent No. 959,496, dated May 31st, 1910, and more particularly concerns the construction and mode of operation of the blade-holder and its associated parts.

Many other minor features of advantage and improvement will be appreciated by those skilled in this art from an understanding of the preferred embodiment of the invention which is illustrated in the accompanying drawings forming a part of this specification and from the following detailed description of the appliance.

Throughout the various views of the drawings like reference characters refer to the same parts.

In the drawings:

Figure 1 shows the internal mechanism of the appliance in plan, the casing or housing being cut away to more clearly illustrate the parts;

Fig. 2 is an end view of the internal mechanism, the bearings and casing being in section, the latter on line 2—2;

Fig. 3 is a perspective view of the blade-holder partly open, the blade being indicated in dotted lines;

Fig. 4 is a section on line 4—4 of Fig. 2;

Fig. 5 is a section on line 5—5 of Fig. 1;

Fig. 6 is a section on line 6—6 of Fig. 2;

Fig. 7 is a fragmentary section showing the operating handle in position for manipulation;

Fig. 8 is a section on line 8—8 of Fig. 7;

Fig. 9 is a face view of one of the gears; and

Fig. 10 is a plan view of one part of the blade-holder.

Referring to the drawings, it will be observed that the casing or shell comprises a sheet-metal main-body 20, curved or of general oval shape in cross-section, as shown in Figs. 2 and 5, and having its lower longitudinal edge portions 21 and 22 overlapped at the bottom of the device, (Figs. 5 and 6), the part 21 at its middle having an integral locking or securing lug 23 extended upwardly through an aperture 24 in the part 22 and bent over. At both of their ends the two portions 21 and 22 have registering holes 25 and 26 adapted to receive tongues or lugs on the end-walls. Also at both of its ends this shell is internally grooved or creased at 27 and 28, (Fig. 4), for the reception of the edges or margins of the metal end-walls 29 and 30 each of general cup shape.

At its top the metal shell has an oval aperture 31 (Fig. 5), of substantial size, the sheet-metal around its margin being bent down at 32 to form a smooth edge or finish. Such aperture or window is ordinarily covered or closed by a removable, curved, sheet-metal closure 33 provided with bent ears 34, 34, at its opposite ends adapted to be sprung into and frictionally engage the walls of depressions 35, 35, in the shell.

The end-wall 30 is apertured at 36 (Fig. 6) to provide a bearing for the blade-holder and is also apertured at 37 and 38 for the accommodation of two inwardly-extended, cylindrical, hollow, open-ended, bearing-members 39 and 40, having the exterior ends spun down against the outer face of the wall to hold the members fixedly in position. This end-wall at its lower edge has a tongue 41 extended down through the alined holes 25 and 26 of the shell and bent over to hold the parts together, as is clearly indicated in Fig. 6.

The opposite end-wall 29 has two similar apertures in which are fastened two similar hollow cylindrical bearing members 42 and 43. This end-wall also has a depression 44 (Figs. 1 and 6) provided with an aperture 45 (Fig. 5) composed of a central cylindrical portion 46, two opposite straight parts 47 and 48, and end enlargements 49 and 50, the central cylindrical portion 46 constituting a bearing for one end of the blade-holder and being in alinement or register with the opposite bearing 36.

Revoluble on the two cylindrical bearing members 40 and 43 I provide a hollow shaft 51 made of a flat blank of sheet-metal bent up transversely to cylindrical shape which gives it a longitudinal butt joint, and having a flange 52 at one end, an integral key 53, and an alined projection 54, all struck up out of the metal of the shaft. Near one end the shaft also has four holes 55, (Fig.

8), constituting part of a clutch mechanism. As is clearly shown in Fig. 4, this shaft revolves on the two members 40 and 43 which afford bearings for its opposite ends of substantial size and length.

Fitted on this shaft at one end and bearing against its flange shoulder is a gear-sector 56 integral with and offset laterally from the main body 57 of general circular disk or washer shape and having a recess shaped to accommodate the shaft fitted over the key 53 so that the disk and sector necessarily revolve with the shaft. Beside this sector and its supporting disk, the shaft is also equipped with a gear 58 likewise recessed to receive the shaft and key 53 so as to revolve with the shaft, the inner face of such gear being grooved at 59 for the reception of the end portion of the stropper proper, the shape of this groove being of general semi-cylindrical form as shown in Fig. 9.

On the opposite end of the shaft a flanged collar 60 is provided which bears against the end of the key or projection 54 and is held in place by upsetting the end of the shaft at a plurality of points 61. Bearing against this collar and held from rotating on the shaft by the key 54, is a disk 62 of the conformation shown in Fig. 5, such disk on its inner surface having a groove 63 of the same shape as the corresponding groove on gear 58.

The two grooves 59 and 63 accommodate the ends of a bent sheet-metal drum or roller 64 of substantially semi-cylindrical form as indicated in Fig. 5. The longitudinal marginal portions of the metal-sheet where they meet are bent in opposite directions at 65, 65, and the latter are provided on their edges with inwardly-extended, sharp teeth pressing into and holding in place the leather facing 66 fitted over the drum. The parts of the roller or drum are assembled in proper relation and then bent to exact form so that the leather is stretched somewhat over the face of the metal drum, insuring a smooth surface under all conditions. The grooves 59 and 63 prevent the metal drum from losing its proper conformation.

The other leather stropping-element 67 is mounted on a like hollow shaft 68 revoluble on the bearings 39 and 42, but this shaft instead of having a gear sector 56 is merely provided with a washer or filler 69 so as to maintain the two gears 58 in register.

For the purpose of rotating these stropping-elements, I provide a handle in the shaft of one of them of peculiar and advantageous construction. When the handle is not to be operated, it is straightened out and housed within the shaft 51, and when the appliance is to be actuated it is projected partially out of the shaft, the extended portion being bent into crank form for manipulation.

This handle or operating appliance, (Figs. 4 and 7), comprises a body 70 having a slightly tapered end portion 71 adapted to fit in the hollow bearing member 43 and be frictionally held therein when not in use, the end of the part 71 being rounded as shown, and when the handle is inoperatively housed within the shaft, projecting slightly beyond the bearing member 43 so that it may be readily engaged by the finger and pushed inwardly, freeing it from the bearing member. The other end of member 70 is bifurcated at 72 and has pivoted thereto at 73 and 74 two links 75 and 76 the opposite ends of which are pivoted at 77 and 78 to a bifurcated portion 79 of a member 80 on which a handle 81 is revolubly mounted. These companion links are of the same length but their pivots are offset as shown, whereby to limit their turning movements thereon.

The part 70 has an enlarged portion 82 of substantially the diameter of the interior of shaft 51, one-half or the major portion of this enlarged part being cut away so that in cross-section it is substantially semi-cylindrical as shown in Fig. 8, providing a flat face 83 having a semi-spherical recess 84 at one end adapted to partially accommodate the clutch ball 85 under certain circumstances.

In Fig. 4 in full lines the handle and its associated mechanism is shown inclosed and frictionally held within the shaft, and in dotted lines this part of the mechanism is shown drawn out, whereas, in Fig. 7, the handle is indicated as bent into cranked operative position. Retraction of the handle from the shaft is limited by the engagement of the part 82 with the inner edge of the bearing-member 40, and when the parts are in this relation the clutch ball 85 is in proper position for coöperation with any one of the four recesses 55 of the shaft provided the handle is turned in a clockwise direction. Under these circumstances the handle is operatively connected to the shaft, as shown in Fig. 8. If, however, it is attempted to rotate the handle in the opposite direction, the ball becomes seated in the recess 84 and does not engage any of the apertures 55 so that the shaft cannot be rotated in the wrong direction and cause mutilation of the leather facings by the blade. As will be readily seen from Fig. 7, the extent to which the handle may be bent into cranked relation is limited and restricted by the two links 75 and 76 engaging each other edgewise.

The blade-holder comprises a transversely-curved or semi-circular metal-member 86, to one end of which is fastened a gudgeon-member 87 having a grooved substantially half round portion 88 fitted in the end of the part 86 and held therein by two lugs 89 integral with the part 86 and bent over into a recess 90 of the member 88, (see Fig. 10). On a squared portion of the round part 87 there is mounted a substantially square disk 91 having two, opposite, concave faces 92 of practically the same curvature as that of the periphery of the disk 57 provided with the offset toothed sector 56. Beside this part 89, the gudgeon is equipped with a pinion 93 of peculiar shape having two pairs of ordinary teeth 94 and intermediate wide teeth 95.

The companion or coöperating blade-holder member comprises a transversely curved or substantially semi-cylindrical body 96 having struck up from one end thereof a small flat handle 97, a projection 98, and an end loop or eye portion 99 equipped with a semi-cylindrical aperture adapted to accommodate the part 86 so that the element 96 can slide relatively to its companion member 86. The hollow of the member 96 accommodates a bar 100 from which two blade-holding projections 101 have been struck up, the opposite ends of the bar being bent at 102, 102, to fit in holes in the part 96, and thus hold the bar 100 in proper position.

The operation of the appliance is substantially as follows:

Assuming that the handle is straightened out and accommodated and concealed in its shaft 51 as shown in Fig. 4, the operator, by pressing on the end of part 71, frees its frictional engagement with the coöperating bearing member and the handle is projected to the dotted line position shown in the same figure, which brings the clutch elements 85 and 55 into register, the ball traveling along with the part 82. Then the handle is bent or cranked into the position shown in Fig. 7, ready for operating the appliance. The bending of the handle is limited as to degree or extent by the edgewise engagement of the two bars 75 and 76 with one another and such bent portions of the handle prevent the clutch elements from moving inwardly out of register, the handle itself being prevented from further outward displacement by the engagement of the part 82 with the bearing member 40.

The operator, by grasping handle 97 pulls out the part 96 through the portion 46 of the aperture 45, the lug 98 passing through the part 103 of the aperture. The blade is applied over the part 96, the blade holes receiving the projections 101, 101. Then the part 96 with the blade thereon is pushed back into the casing, the lug 98 passing inwardly through the enlargement 103 of the portion 46 of the aperture. Thereupon, the handle 81 is turned and by reason of the intermeshing of the gears 58, 58, the two substantially semi-cylindrical stropping elements will be rotated in opposite directions, simultaneously stropping the corresponding sides of both edges of the blade, the latter during this operation being concaved and by its own resiliency holding the blade edges in adequate contact with the leather surfaces of the stroppers. During this operation, turning of the blade holder is positively prevented by one of the curved edges 92 of the disk 91 overlying the curved edge of the member 57. When the stropping elements have arrived in such positions as to permit a half rotation of the blade without conflict therewith, the gear-sector 56 engages the teeth of the part 93, causing a half rotation of the blade-holder and the blade held therein. As will be readily understood, this movement is permitted because portions of the disk 91 are accommodated in the space between the gear sector 56 and the gear 58, present by reason of the fact that the portion 56 is struck out of the plane of the member 57, leaving the gap referred to as shown in Fig. 4. This constitutes in effect a Geneva movement, which causes intermittent rotation of the blade-holder and a locking of the holder when not turning. As soon as the blade is thus reversed, the continued rotation of the stropping elements causes them to sharpen the opposite sides of the same two edges of the blade so that there is an alternate stropping effect on the two sides of each edge. Upon completion of the stropping or sharpening operation, the part 96 of the blade holder and the blade are withdrawn through the aperture 45 and the blade removed, the handle then being straightened out and pushed back into the shaft which it had previously operated, being retained in the shaft by frictional engagement with the bearing member 43. As will be readily understood, by reason of the projection or lug 98 on the member 96 the half portion of the blade-holder can be withdrawn from the casing only when this part is in register with the portion 103 of the aperture in the casing or end wall, and when this occurs the blade is in register with the parts 47 and 48 of the aperture and its sharpened edges are prevented from contact with anything during withdrawal or insertion especially by reason of the enlarged ends 49 and 50 of the aperture. Withdrawal or displacement of the blade-holder during a part of the sharpening operation is prevented because the projection 98 overlies the margin of the aperture 46, preventing withdrawal. It should be observed, furthermore, that the end disk 62 of each stropping element projects outwardly beyond the surface of the leather and when the stropping operation is occurring with the blade-holder in the position shown in Fig. 6 with the lug 98 in register with the hole 103, withdrawal of the blade while it is concaved and in contact with the stroppers is prevented by such projecting part of the end disks.

By those skilled in this art it will be appreciated that the parts of this appliance are so constructed that they are economical to manufacture and may be assembled with ease and dispatch, that the device presents a pleasing appearance, that the appliance is self-contained, requiring no separate or additional casing, that it has a disappearing operating handle, that the stropping elements contain no wood likely to warp or twist, and that the leather facings are secured without glue or other adhesive. It will be furthermore appreciated that all precautions are taken to prevent injury both to the leather surfaces and to the sharpened blades. Revolution of the stropping rollers in the wrong directions is prevented, and the blade can only be withdrawn and inserted when the parts are in proper relation to receive it, provision being made for prevention of contact of the blade edges with any parts except the stropping elements at the proper time.

While I have herein illustrated and described a preferred and desirable embodiment of the invention, it is to be understood that it is susceptible of other embodiments, and that many minor mechanical changes may be incorporated in the structure depicted without departure from the substance and essence of the invention and without the sacrifice of any of its substantial benefits and advantages.

Certain features of the structure disclosed, but not claimed, in this application constitute the subject-matter of other co-pending patent applications as follows: Serial No. 214,090, stropping elements, filed Jan. 28, 1918; Serial No. 214,091, casings, filed Jan. 28, 1918; Serial No. 228,090, shaft operating devices, filed April 12, 1918.

I claim:

1. In a sharpening-appliance of the character described, the combination of an apertured casing, sharpening-elements and a blade-holder in said casing, means to rotate said elements and intermittently actuate said blade-holder, said blade-holder comprising a rotary member permanently mounted in said casing and a second companion member provided with one or more blade-holding projections, the blade being adapted to be accommodated between said members and held by said projections, said second member being rotatable in said casing with said first member and slidable longitudinally relatively to said first member outwardly through the aperture of said casing to permit the insertion and removal of blades, said two members transversely unitedly forming a journal for the blade-holder at one end thereof, and means to limit the withdrawal of said sliding blade-holder member through said casing aperture, substantially as described.

2. In a sharpening-appliance of the character described, the combination of sharpening-elements, a blade-holder, means to rotate said elements and intermittently actuate said blade-holder, said blade-holder comprising a rotary member substantially semi-circular in cross-section and a second member provided with one or more blade-holding projections, the blade being adapted to be accommodated between said members, said second member being rotatable with said first member and slidable relatively thereto to permit the insertion and removal of blades, said slidable member having at its inner end an integral substantially semi-circular loop fitting over said first member, substantially as described.

3. In a sharpening-appliance of the character described, the combination of an apertured casing, sharpening-elements and a blade-holder in said casing, means to rotate said elements and intermittently actuate said blade-holder, said blade-holder comprising two blade-engaging parts only adapted to receive the blade between them, the one part permanently located in said casing having a rotary mounting only, the companion part equipped with projections to coöperate with apertures in the blade being rotatable in said casing with said first part and constructed to slide longitudinally relatively thereto through the casing aperture to permit insertion and removal of blades, and means aside from the blade to prevent the withdrawal of said sliding blade-holder part and blade through said casing aperture except when the blade is in register with said aperture and the sliding part is positioned with its projections extended upwardly, substantially as described.

4. A sharpening-appliance of the character described including in combination, sharpening-elements, a blade-holder, means to rotate said elements and intermittently actuate said blade-holder, the latter comprising a metal-sheet substantially semi-circular in cross-section, and a gudgeon fixed therein by lugs integral therewith, said blade-holder also including a second substantially semi-circular member having an approximately semi-circular loop at one end encircling said first member, said second member having secured therein a bar with projections adapted to fit in apertures of the blade, said first member being rotatable only, said second member being rotatable with said first member and slidable relatively thereto for the insertion and removal of blades, the latter being held between said members with the first member accommodating said projections and engaging the blade on opposite sides thereof, said pair of members at one end unitedly forming a cylindrical journal, substantially as described.

5. A sharpening-appliance of the character described including in combination, sharpening-elements, a blade-holder, means to rotate said elements and intermittently actuate said blade-holder, the latter comprising a member having a rotary movement only and a second member having means to retain a blade in position thereon and constructed and associated with the first member to rotate therewith and capable of sliding longitudinally relatively thereto to permit insertion and removal of blades, the blade being held between said members with each of the latter overlying one face only of the blade, and means to limit the longitudinal separation of said blade-holder members, substantially as described.

GEORGE G. FLOYD.